（12） United States Patent
Lau

(10) Patent No.: US 7,721,883 B2
(45) Date of Patent: May 25, 2010

(54) DISK PROTECTIVE ENCLOSURE

(75) Inventor: Kwok Din Lau, Hong Kong (CN)

(73) Assignee: Finest Products Limited, Hong Kong (CN)

( * ) Notice: Subject to any disclaimer, the term of this patent is extended or adjusted under 35 U.S.C. 154(b) by 643 days.

(21) Appl. No.: 11/456,502

(22) Filed: Jul. 10, 2006

(65) Prior Publication Data

US 2008/0006546 A1    Jan. 10, 2008

(51) Int. Cl.
B65D 85/57    (2006.01)

(52) U.S. Cl. .................................. 206/310; 206/308.1

(58) Field of Classification Search .............. 206/308.1, 206/310
See application file for complete search history.

(56) References Cited

U.S. PATENT DOCUMENTS

| | | | |
|---|---|---|---|
| 5,400,902 A | 3/1995 | Kaminski | |
| 5,494,156 A | 2/1996 | Nies | |
| 5,526,926 A | 6/1996 | Deja | |
| 5,586,651 A | 12/1996 | Krummenacher | |
| 5,727,680 A | 3/1998 | Liu | |
| 5,944,181 A * | 8/1999 | Lau | 206/308.1 |
| 6,065,594 A | 5/2000 | Sankey et al. | |
| 6,123,192 A | 9/2000 | Rufo, Jr. | |
| 6,196,384 B1 | 3/2001 | Belden, Jr. | |
| 6,237,763 B1 * | 5/2001 | Lau | 206/308.1 |
| 6,364,108 B1 | 4/2002 | Bin | |
| 6,425,481 B1 | 7/2002 | Choi | |
| 6,427,833 B1 | 8/2002 | Hui | |
| 6,554,132 B2 | 4/2003 | Lau | |
| 6,672,455 B2 | 1/2004 | Belden, Jr. et al. | |
| 6,719,133 B2 | 4/2004 | Perez et al. | |

(Continued)

FOREIGN PATENT DOCUMENTS

AU    2003229251 A    11/2004

(Continued)

OTHER PUBLICATIONS

Office Action for U.S. Appl. No. 11/465,687, mailed Oct. 28, 2008, 19 pages.

(Continued)

Primary Examiner—Mickey Yu
Assistant Examiner—Jenine M Pagan
(74) Attorney, Agent, or Firm—Danton K. Mak; Sheldon Mak Rose & Anderson PC

(57) ABSTRACT

A holder for a disk having a central opening and front and back surfaces includes a base having a planar panel and a forwardly projecting pedestal including a ring for supporting the disk, an inwardly extending disk member, a plurality of stem members for engaging the disk opening, and a corresponding plurality of U-shaped connector segments supporting the stem members in cantilevered relation to the disk member. Alternating ones of the stem members have outwardly projecting retainer members and inwardly projecting tab members, collectively forming a button surface for receiving downward pressure whereby the disk is releasable. Deformation of the pedestal in response to the downward pressure is concentrated in the connector segments and, to a limited extent, an innermost portion of the disk member, providing improved structural integrity for a given downward force required to release the disk.

3 Claims, 2 Drawing Sheets

U.S. PATENT DOCUMENTS

| | | |
|---|---|---|
| 6,752,266 B2 | 6/2004 | Ku |
| 6,799,679 B2 * | 10/2004 | Hui .................... 206/308.1 |
| 6,874,625 B2 | 4/2005 | Chang |
| 6,951,278 B2 * | 10/2005 | Pettigrew et al. ......... 206/308.1 |
| 2001/0047947 A1 * | 12/2001 | Lau ........................... 206/310 |
| 2002/0011426 A1 | 1/2002 | Byrne et al. |
| 2002/0112974 A1 | 8/2002 | Lau |
| 2003/0015441 A1 * | 1/2003 | Kang et al. ................ 206/310 |
| 2003/0034258 A1 * | 2/2003 | Lee ....................... 206/308.1 |
| 2003/0168361 A1 | 9/2003 | Lau |
| 2003/0196918 A1 | 10/2003 | Lau |
| 2004/0129587 A1 | 7/2004 | Lax et al. |
| 2004/0173481 A1 | 9/2004 | Choi et al. |
| 2004/0178091 A1 | 9/2004 | Lau |
| 2005/0098453 A1 | 5/2005 | Lax |
| 2005/0173273 A1 | 8/2005 | Marsilio et al. |
| 2005/0269223 A1 | 12/2005 | Wawrzynowski |
| 2005/0279143 A1 | 12/2005 | Belden, Jr. et al. |
| 2005/0279657 A1 | 12/2005 | Bjerregaard et al. |
| 2006/0191809 A1 | 8/2006 | Heuser et al. |
| 2007/0102310 A1 | 5/2007 | Osborn et al. |
| 2007/0193898 A1 | 8/2007 | Hu |
| 2007/0215498 A1 | 9/2007 | Barnette et al. |

FOREIGN PATENT DOCUMENTS

| | | |
|---|---|---|
| CN | 2418106 Y | 2/2001 |
| CN | 2466763 Y | 12/2001 |
| CN | 2624347 Y | 7/2004 |
| JP | 2002019871 A | 1/2002 |
| JP | 2004182315 A | 8/2004 |
| JP | 2005035664 A | 2/2005 |
| WO | WO2005019065 A | 3/2005 |

OTHER PUBLICATIONS

Office Action for U.S. Appl. No. 11/465,745, mailed Jan. 13, 2009, 13 pages.

Final Office Action for U.S. Appl. No. 11/465,687, mailed Apr. 29, 2009, 12 pages.

PCT International Search Report, mailing date Nov. 8, 2007 (Aug. 18, 2006); International Application No. PCT/CN2007/070510; International Filing date Aug. 17, 2007; (Earliest) Priority date Aug. 18, 2006.

PCT International Search Report (mailing date Dec. 27, 2007); PCT/CN2007/070508; International Filing Date: Aug. 17, 2007; (Earliest) Priority Date Aug. 18, 2006; Applicant, Finest Products Limited et al.

* cited by examiner

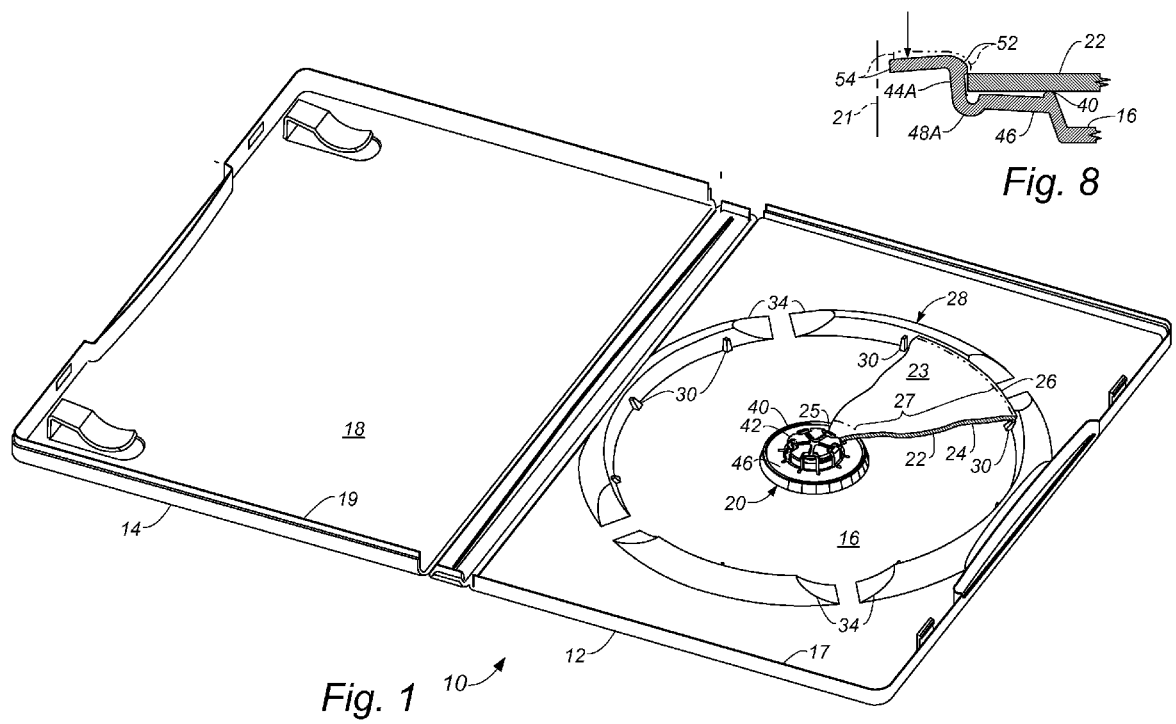

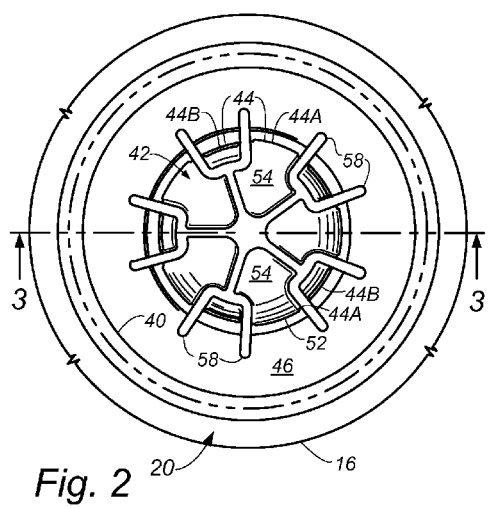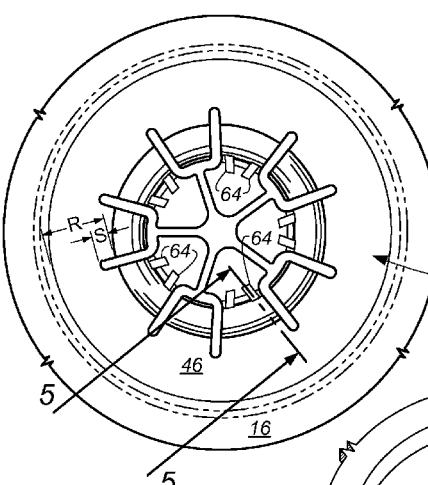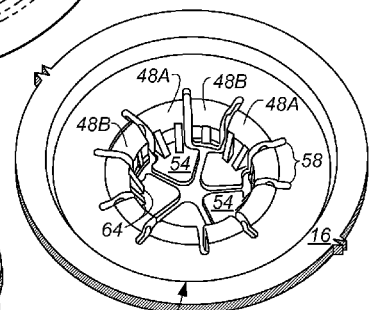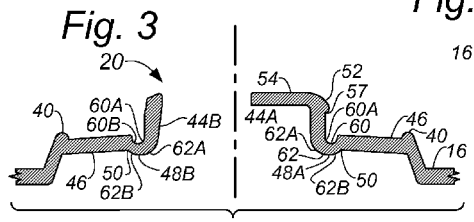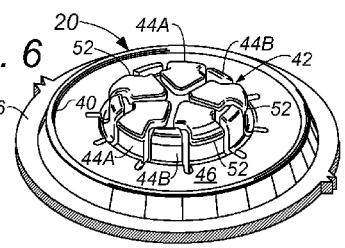

DISK PROTECTIVE ENCLOSURE

BACKGROUND

The present invention relates to optical data disks such as compact disks (CDs) and video disks (DVDs) that have central circular locating openings, and more particularly to devices for holding and/or protectively enclosing such disks for storage of same.

Data disks such as compact disks and video disks typically have large amounts of digitally stored information that is optically readable through a transparent bottom layer of the disk by a movable head during rotation of the disk. The information is arranged in one or more tracks that are covered by a thin protective top layer of the disk that can have labeling applied thereto such as by silkscreening. Normal handling of the disk can result in scratching of the bottom layer, resulting in loss of data by interference with the optical path such as by loss of focus and/or lateral image displacement. Also, data can be lost by scratching of the protective layer which is typically very thin, on the order of 20 microns, resulting in removal of information from a vapor deposited metal layer that is only about 0.1 micron thick. Protective containers for the disks in common use have a central pedestal for supportively gripping the disc by engaging the central opening without contacting either side of the disk within data-containing regions thereof. Such containers typically have a ledge for contacting portions of an outer perimeter of the disk for stabilizing the disk against tipping on the pedestal. The disk is loaded into the container by lowering it onto the pedestal while gripping opposite perimeter portions, engagement with the pedestal being typically effected by simultaneous finger pressure against the disk proximate the central opening. Removal of the disk is similarly effected by finger pressure against the pedestal and simultaneous lifting at the perimeter portions.

Disk holders and containers of the prior art typically exhibit one or more of the following disadvantages:

1. They are ineffective in that the disk can easily become disengaged from the pedestal in normal and/or expected handling of the device;
2. They have structural components that are likely to be snagged or damaged during normal use and handling;
3. They are difficult to operate as to engagement and/or disengagement of the disk; and
4. They are excessively complex, involving high tooling costs, expensive quality control, and/or high rejection rates in production.

Thus there is a need for a protective disk container that overcomes at least some of the disadvantages of the prior art.

SUMMARY

The present invention meets this need by providing a molded disk holder wherein structural components are unlikely to be snagged or damaged during normal use and handling, and that is particularly effective, inexpensive to produce, and easy to use. In one aspect of the invention, the holder includes a base having a base panel portion; a pedestal projecting forwardly from the panel portion on a pedestal axis and having a forwardly projecting ring member; a central button portion having a plurality of axially extending stem members for contacting a central opening of the disk. A plurality of retainer members project radially outwardly from at least some of the stem members for releasably retaining the disk on the pedestal; a disk member extends inwardly from the ring structure; and a plurality of connector segments support the stem members in cantilevered relation to the disk member, each connector segment having an upper surface including an outwardly facing portion joining an outwardly facing surface of a corresponding stem member, and an inwardly facing portion joining an upper surface of the disk member. Each connector segment also has a lower surface with an inwardly facing portion joining an inwardly facing surface of the corresponding stem member and an outwardly facing portion joining a lower surface of the disk member, the connector segments collectively having a relaxed condition, an engaged condition wherein the retainer members project outwardly from the central opening when the disk is supported on the ring structure, and, with respect to the at least some stem members having the retainer members, a flexed condition wherein the retainer members are deflected radially inwardly and axially downwardly from the relaxed position in response to external downward pressure applied to the button portion sufficient to permit passage of the retainer members through the central opening of the disk, thereby releasing the disk. Preferably the lower surfaces of the connector segments are elevated relative to the base panel portion. This facilitates facing planar external support of the base panel portion such as when the holder is placed on a table top or similar firm support during disk engagement and/or release. Preferably the disk member is inclined upwardly and inwardly about the pedestal axis for enhanced structural integrity. Preferably the disk member is inclined upwardly and inwardly about the pedestal axis for enhanced structural integrity.

The holder is typically used with disks having a data region extending inwardly from proximate an outer perimeter of the disk to a diameter of approximately twice that of the central opening, the ring member being preferably configured for contacting the disk between the central opening and the data region.

Preferably button structure also includes a tab member radially inwardly projecting from each of the stem members having retainer members for receiving respective portions of the external pressure applied to the button portion, a button surface being collectively formed by forwardly facing surfaces of the tab members, the retainer members, and the at least some stem members having the retainer members. Preferably the button surface slopes forwardly and inwardly from outer extremities of the retainer members sufficiently for ramped engagement with the central opening in the relaxed position of the connector segments. Also, or in the alternative, rearwardly facing engagement surfaces of the retainer members preferably have outwardly and forwardly extending extremity portions for facilitating disengagement from the disk.

Preferably, a gusset member is formed between each tab member and the corresponding stem member for substantially preventing deformation of each combined tab member and stem member during application of the external pressure. More preferably each gusset member is one of a spaced pair of gusset members formed between each tab member and the corresponding stem member.

Respective slots can be formed as spaces between the stem members, each slot extending radially only partway outwardly within the disk member. Preferably the slots extend less than half a radial distance between the connector segments and the ring member for limiting flexure of the disk member. More preferably, the slots extend not more than approximately 30 percent of the radial distance between the stem members and the ring member.

Preferably the upper surface of each connector segment smoothly and continuously slopes from substantially vertical at the corresponding stem member to approximately vertical proximate the disk member, being concave upwardly therebetween, and the lower surface of each connector segment is smoothly convex downwardly in approximate cross-sectional concentricity with the upper surface of the connector segment. The retainer members can be on alternating ones of the stem members.

The base can also have an edge support structure projecting forwardly from the base panel portion, the edge support structure being adapted for contacting the rear surface of the disk proximate its perimeter, a portion of the edge support structure extending forwardly of the disk in concentric relation to the pedestal axis for protecting an edge portion of the disk, a pair of finger depressions being formed therein on opposite sides of the pedestal axis for permitting the disk to be gripped by a user's fingers.

The holder of the present invention can also be incorporated in a case having a lid movably connected to the base for accessing the disk.

DRAWINGS

These and other features, aspects, and advantages of the present invention will become better understood with reference to the following description, appended claims, and accompanying drawings, where:

FIG. 1 is a perspective view of a protective disk case incorporating holder according to the present invention, the case being in an open condition;

FIG. 2 is a top plan view of a pedestal portion of the case FIG. 1;

FIG. 3 is a sectional view on line 3-3 of FIG. 2;

FIG. 4 is a bottom plan view of the pedestal portion of FIG. 2;

FIG. 5 is a detail sectional view on line 5-5 of FIG. 4;

FIG. 6 is an upper perspective view of the pedestal portion of FIG. 2;

FIG. 7 is a lower perspective view of the pedestal portion of FIG. 2; and

FIG. 8 is a detail sectional view on a portion of line 3-3 in FIG. 2, showing a portion of the pedestal portion in a deformed condition.

DESCRIPTION

The present invention is directed to a disk holder, an exemplary embodiment being in the form of a container or case that is particularly effective for protectively storing disks such as CDS and DVDs. With reference to FIGS. 1-7 of the drawings, a protective disk case 10, which may have a transparent jacket (not shown) bonded thereto for displaying printed material, includes a base 12, a lid 14, and a spine 15 that movably connects the base and lid. In an exemplary configuration, the case 10 is an integrally formed molded member, so-called "living hinges" being formed along opposite edges of the spine 15. The base 12 and lid 14 include respective panel portions 16 and 18, and respective perimeter side portions 17 and 19 that snap together in edgewise adjacency in a closed condition of the case 10, the spine 15 and the side portions 17 and 19 together forming four side walls of the case 10, the lid panel portion 18 forming a front wall, the base panel portion 16 forming a rear wall. In further description of the case 10, the terms "front" and "forward" with respect to the base refer to a direction toward the lid 14 in the closed condition of the case 10; conversely, "rear", "rearward", and "back" refer to a direction away from the lid portion.

A hub or pedestal 20 of the case projects forwardly from the base panel portion 16 on a pedestal axis 21 for supportively engaging an optical data disk 22 having front and rear face surfaces 23 and 24, a circular central opening 25, and a periphery 26, a data region 27 of the disk extending inwardly from proximate the periphery and having an inside diameter somewhat greater than that of the central opening 25. An edge-support portion 28 of case 10 also projects forwardly on the base panel portion 16 in concentric relation to the pedestal axis 21 proximate the periphery 26 of the disk 22. The edge-support portion 28 is formed with a circumferentially spaced plurality of supports 30 for stabilizing the disk 22 against tipping, and a rim portion 32 that projects forwardly of the supports 30 for protecting the disk 22 proximate the periphery 26 while the disk is engaged with the pedestal 20. The edge-support portion is also formed with at least one pair of finger depressions 34 for permitting opposite perimeter portions of the disk 22 to be grasped by a user of the container 10, the rim portion 32 being interrupted by the finger depressions 34.

According to the present invention, the pedestal 20 includes a ring structure 40 for supporting the disk 22 in elevated relation to the base panel portion, a button portion 42 having a plurality of stem members 44 for engaging the central opening 25, a disk member 46 projecting inwardly from the ring structure, and respective connector segments 48 flexibly supporting the stem members at an inward extremity 50 of the disk member. At least some of the stem members, designated 44A, have outwardly projecting retainer members 52 thereon for holding the disk 22 proximate the ring structure 40. Each of the stem members 44A also has a tab member 54 extending therefrom generally inwardly toward the pedestal axis 21, the tab members collectively being adapted for receiving downwardly directed finger pressure to produce inward deflection of the retainer members whereby the disk 22 is releasable from the pedestal 20 as further described below. Also, upper surfaces of the stem members 44A, the retainer members 52 and the tab members 54 collectively form a button surface 56, the button surface being tapered upwardly and inwardly from outer extremities of the retainer members for facilitating concentric engagement of the disk 22. Also, rearwardly facing engagement surfaces 57 of the retainer members have outwardly and forwardly extending extremity portions for facilitating disengagement from the disk. Some others of the stem members, designated 44B, optionally do not have retainer members or tab members, and preferably remain substantially stationary when the retainer members 52 are inwardly deflected in response to the downwardly directed finger pressure, for maintaining the disk 22 proximately concentric with the pedestal axis 21 when the disk is being released. Accordingly, the connector segments for the stem members 44A, designated 48A, are connected to the disk member 46 independently of those connector segments, designated 48B, that support the stem members 44B. More particularly, the stem members 44 are spaced apart, respective slots 58 being formed therebetween. Further in the exemplary and preferred configuration shown in the drawings, the slots 58 extend a distance S radially partway into the disk member 46 as shown in FIG. 4, insuring independent support of the connector segments 48, and imparting a slight flexibility to the disk member proximate the inner extremity thereof. Preferably the distance S is not more than approximately 30 percent of the radial distance between the inward extremity 50 of the disk member and the inside of the ring structure 40 for substantially confining flexibility of the disk member to proximate the inward extremity 50 thereof.

A particularly advantageous feature of the present invention is the connector segments, and especially those designated 48A and supporting the stem members 44A, being formed for providing a preponderance of the compliance associated with the inward deflection of the retainer members, yet providing robust structural integrity. As best shown in FIG. 3, the connector segments 48A are generally U-shaped in cross-section, having an upper surface 60 including an outwardly facing portion 60A smoothly joining an outwardly facing surface of a corresponding stem member, and an inwardly facing portion 60B, and a lower surface 62 having an inwardly facing portion 62A smoothly joining an inwardly facing surface of the corresponding stem member and an outwardly facing portion 62B, the connector segments 48A collectively having a relaxed condition as shown in FIG. 3, an engaged condition wherein the retainer members project outwardly from the central opening when the disk 22 is supported on the ring structure, and a flexed condition wherein the retainer members 52 are deflected radially inwardly and axially downwardly from the relaxed position as shown in FIG. 8 in response to external downward pressure applied to the tab members 54 sufficient to permit passage of the retainer members through the central opening 25 of the disk. The engaged condition differs from the relaxed condition only to the extent that the stem members 44 are an interference fit within the central opening of the disk 25. Typically the fit is "line-to-line" or slightly loose, that condition of the stem members also being shown in FIG. 3.

Preferably the upper surface 60 of each connector segment smoothly and continuously slopes from substantially vertical at the corresponding stem member 44 to approximately vertical proximate the disk member 46, being concave upwardly therebetween, and the lower surface 62 of each connector segment is smoothly convex downwardly in approximate cross-sectional concentricity with the upper surface of the connector segment. This configuration advantageously avoids excessive stress concentrations and contributes to the robust structural integrity of the pedestal 20, further described below.

Preferably the button portion 42 includes at least one gusset member 64 connecting and reinforcing each of the tab members 54 and corresponding stem members 44A. As shown in FIGS. 4, 5, and 7, an exemplary and preferred configuration of the pedestal 20 has a spaced pair of the gusset members 64 connected between each tab member 54 and the stem member 48A from which it extends. Advantageously, the gusset members substantially prevent the combination of each tab member 54 and the corresponding stem member 48A from flexing during application of the external downward pressure, without requiring excessive section thicknesses that would potentially give rise to difficulties in molding the case 10.

By concentrating flexure of the pedestal 20 within the connector segments 48A, and to a limited extent within an innermost region of the disk member 46, the present invention provides predominantly inward movement, and a lesser amount of downward movement, of the retainer members 52 in response to the downward pressure applied to the tab members 54. Consequently, the pedestal 20 can have greater structural integrity for a given required downward pressure sufficient to release the disk 22.

In the exemplary configuration of the pedestal 20 shown in the drawings, the connector segments 48B are of the same cross-sectional form as the segments 44A, although it will be understood that the segments 48B can also be formed differently than the segments 48A. Also in the exemplary configuration, the disk member 46 is located in raised relation to the base panel portion 46, being slightly inclined uniformly upwardly and inwardly to the inward extremity 50, the top of the disk member being slightly below an upper extremity of the ring structure 40 as best shown in FIG. 3. The slight upward and inward inclination of the disk member 46 also advantageously provides enhanced stiffness for a given thickness of the disk member. Other configurations of the disk member 46 are also contemplated, the inward extremity 50 of the disk member being preferably sufficiently elevated that the lower surfaces 62 of the connector segments 48 do not project below the base panel portion 16; otherwise, it would not be possible to place the case 10 on a planar supporting surface with the base panel portion solidly supported thereby, as is normally desired. Further, although the exemplary disk member 46 shown in the drawings is of uniform cross-sectional thickness, local thinning and/or thickening, particularly near the connector segments 48, can be employed to decrease and/or increase the effective stiffness of selected ones of the stem members 44.

Although the present invention has been described in considerable detail with reference to certain preferred versions thereof, other versions are possible. For example, the case 10 can be configured for incorporating an additional pedestal 20 on the lid panel portion 18, and/or receiving disk-carrying trays, such as disclosed in U.S. Pat. No. 6,554,132 to the present inventor and pending application Ser. No. 11/182, 541, entitled Disk Protective Enclosure, which was filed Jul. 15, 2005. Both disclosures are incorporated herein in their entirety by these references. Therefore, the spirit and scope of the appended claims should not necessarily be limited to the description of the preferred versions contained herein.

What is claimed is:

1. A case for a disk having a central opening and front and back face surfaces, a data region extending inwardly from proximate an outer perimeter of the disk to a diameter of approximately twice that of the central opening, the case comprising:

(a) a base having a planar panel portion and an edge support structure projecting forwardly from the panel portion, the edge support structure being adapted for contacting the rear surface of the disk proximate a perimeter extremity thereof, a portion of the edge support structure extending forwardly of the rear disk surface in concentric relation to the pedestal axis for protecting an edge portion of the disk, the edge support structure having a pair of finger depressions formed therein on opposite sides of the disk for permitting the disk to be gripped by a user's fingers;

(b) an lid movably connected to the base for accessing the disk;

(c) a pedestal projecting forwardly from the base panel portion on a pedestal axis, the pedestal including:

(i) a ring member projecting forwardly from the base panel portion for supporting the disk between the central opening and the data region;

(ii) a central button portion having a plurality of axially extending stem members for contacting the central opening of the disk and a plurality of retainer members projecting radially outwardly from alternating ones of the stem members for releasably retaining the disk on the pedestal;

(iii) a tab member radially inwardly projecting from each of the stem members having retainer members for receiving respective portions of the external pressure applied to the button portion, a button surface being collectively formed by forwardly facing surfaces of the tab members, the retainer members, and the stem members having the retainer members;

(iv) a disk member extending inwardly from the ring structure in elevated relation to the base panel portion, the disk member being inclined upwardly and inwardly about the pedestal axis for enhanced structural integrity;

(v) a plurality of U-shaped connector segments connecting the stem members of the button portion in cantilevered relation to the disk member, each connector segment having an upper surface including an outwardly facing portion joining an outwardly facing surface of a corresponding stem member, and an inwardly facing portion, and a lower surface having an inwardly facing portion joining an inwardly facing surface of the corresponding stem member and an outwardly facing portion, the connector segments collectively having a relaxed condition, an engaged condition wherein the retainer members project outwardly from the central opening when the disk is supported on the ring structure, and, with respect to the stem members having the retainer members, a flexed condition wherein the retainer members are deflected radially inwardly and axially downwardly from the relaxed position in response to external pressure applied to the button portion sufficient to permit passage of the retainer members through the central opening of the disk, thereby releasing the disk; and (vi) a gusset member integrally formed between each of the tab members and the corresponding stem member for concentrating flexion of the pedestal in the connector segments in response to the externally applied pressure, wherein respective slots are formed as spaces between the stem members, each slot extending not more than approximately 30 percent of a radial distance between the connector segments and the ring member, wherein the button surface slopes forwardly and inwardly from outer extremities of the retainer members sufficiently for ramped engagement with the central opening in the relaxed position of the connector segments, and rearwardly facing engagement surfaces of the retainer members have outwardly and forwardly extending extremity portions for facilitating disengagement from the disk, and wherein the lower surfaces of the connector segments are elevated relative to the base panel portion for facilitating facing planar external support of the base panel portion.

2. The holder of claim 1, wherein each gusset member is one of a spaced pair of gusset members formed between each tab member and the corresponding stem member.

3. The disk case of claim 1 wherein the upper surface of each connector segment smoothly and continuously slopes from substantially vertical at the corresponding stem member to approximately vertical proximate the disk member, being concave upwardly therebetween, and the lower surface of each connector segment is smoothly convex downwardly in approximate cross-sectional concentricity with the upper surface of the connector segment.

* * * * *